April 28, 1953  E. B. WILSON, JR., ET AL  2,636,926
MICROWAVE SPECTROGRAPHY
Filed April 13, 1948  2 SHEETS—SHEET 2
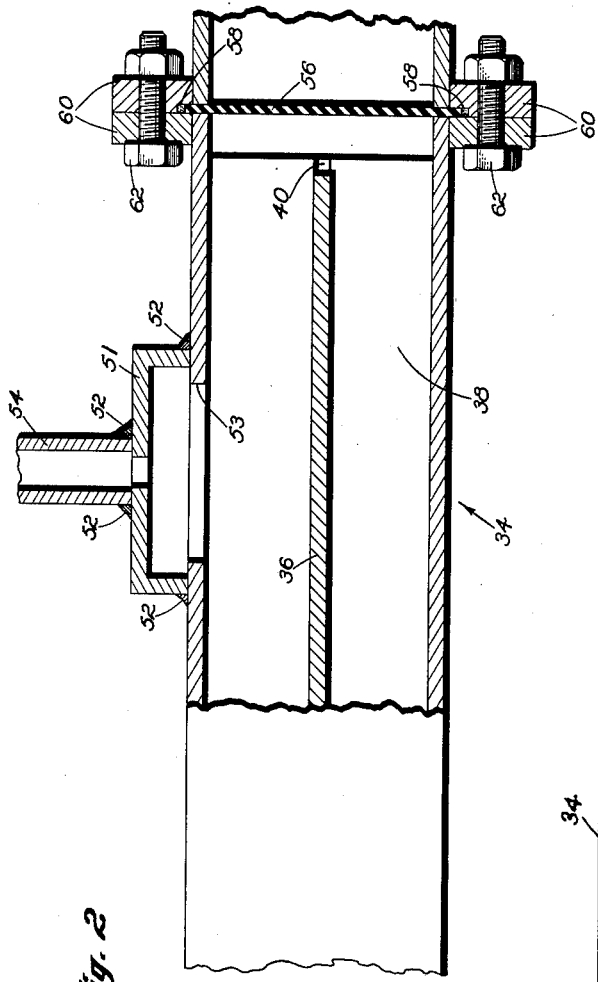
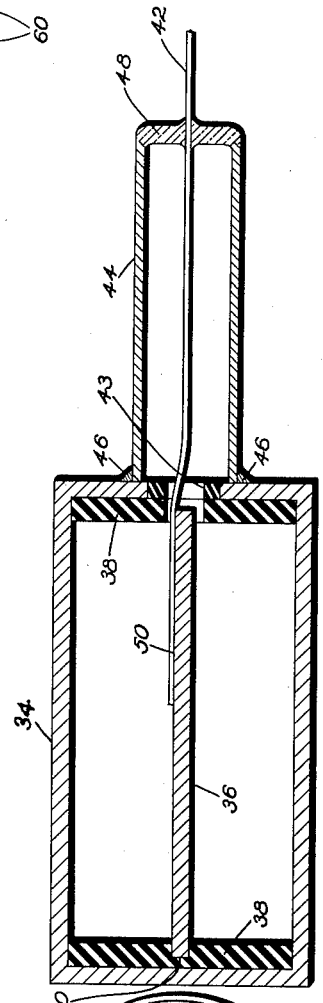
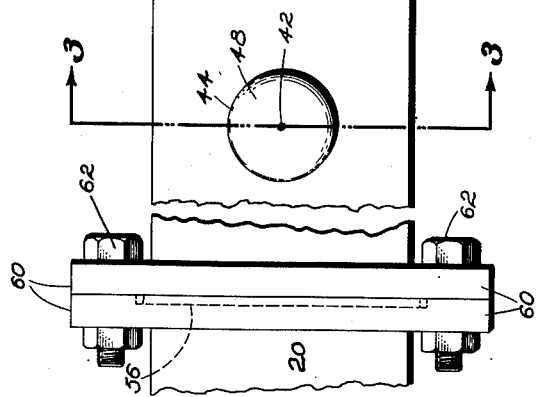
Inventor: Edgar B. Wilson, Jr.
Richard H. Hughes
by: William O. Hulbert
Attorney Patented Apr. 28, 1953

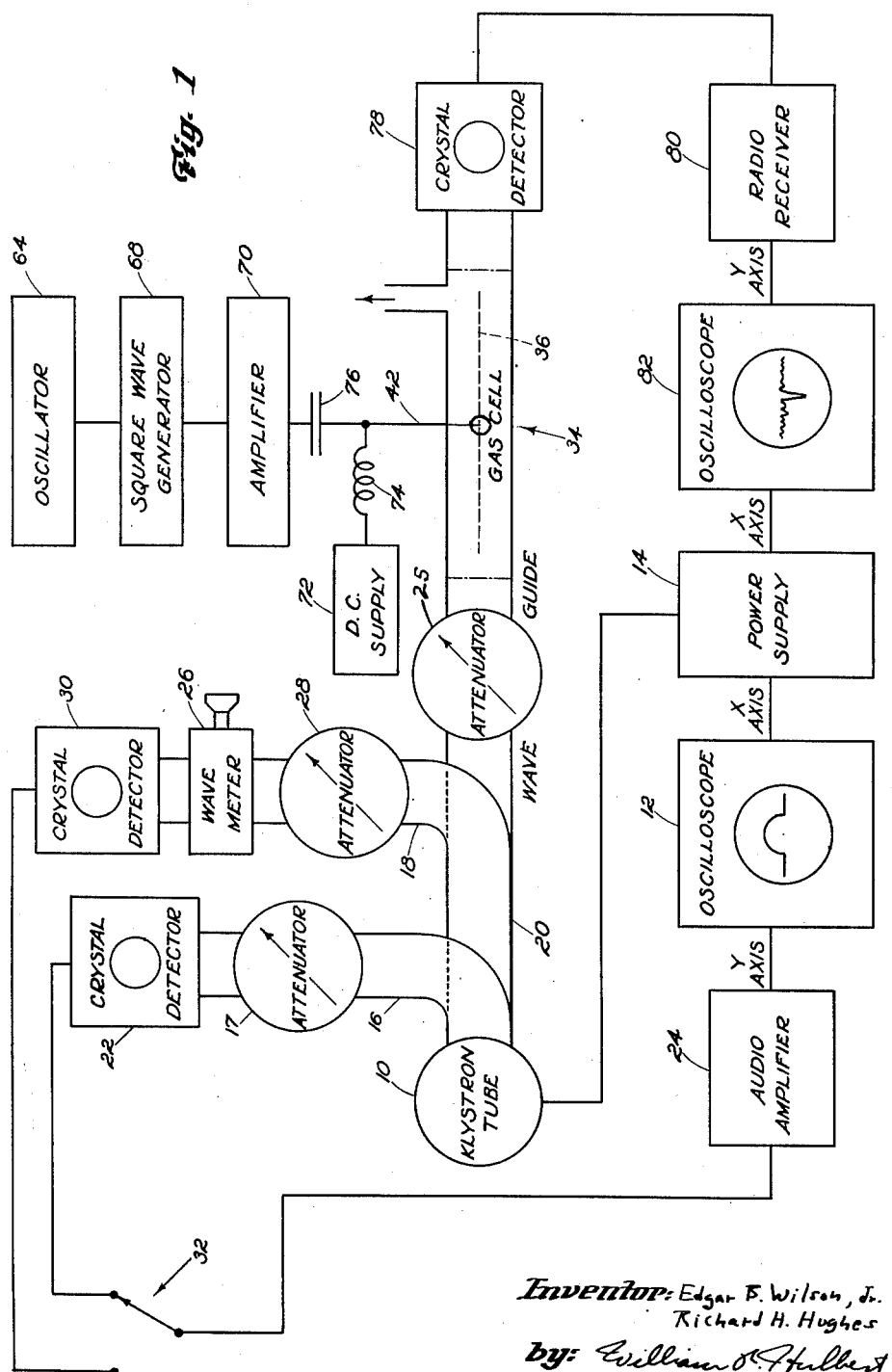

2,636,926

UNITED STATES PATENT OFFICE 2,636,926

MICROWAVE SPECTROGRAPHY

Edgar B. Wilson, Jr., Cambridge, and Richard H. Hughes, Brookline, Mass.

Application April 13, 1948, Serial No. 20,708

24 Claims. (Cl. 175—183)

This invention relates to microwave spectroscopy and more particularly concerns improved methods of and means for detecting and analyzing the spectra of gaseous materials at microwave frequencies by utilizing the so-called "Stark effect."

The region of microwave spectroscopy is in between the region encompassed by the methods and instruments used in infra-red spectroscopy and that embraced by ordinary radio-frequency techniques. Recently there has arisen a field called radio-frequency spectroscopy which includes the range from a fraction of a megacycle to hundreds of megacycles. The field of microwave spectroscopy, however, is the spectral region of thousands of megacycles, the presently used range for spectroscopic purposes consisting of the region between 10,000 mc. (3 cm.) and 60,000 mc. (0.5 cm.), it being understood that the foregoing frequency range is given by way of illustration only and not by way of limitation with respect to the present invention. The electrical techniques involved in microwave spectroscopy embody a combination of those used in radio-frequency work and those used in optical phenomena. Microwaves are reflected in much the same manner as light, except that in the case of microwaves the wave length is of the same order of magnitude as the dimensions of ordinary laboratory reflectors.

When the same techniques are used in microwave spectroscopy as are used in infra-red work, i. e., a light source giving a continuous spectrum and a grating acting as a monochromator, the resolution is very poor. It appears impractical to build a grating with a large number of lines for microwave spectroscopy and there are no good sources of a continuous spectrum over a wide frequency range. To avoid this difficulty a monochromatic microwave source is used, the frequency of which can be easily varied by electrical or mechanical means.

Many of the sharp-line absorptions of energy at microwave frequencies are very weak. While in infra-red spectroscopy complete absorption may take place in a few centimeters, many kilometers are necessary to approach complete absorption in this region. Microwave spectrographs must therefore be very sensitive to be useful.

Another unique characteristic of this new spectroscopy is the resolution which can be obtained. By using low pressures of the gases studied the line width can be reduced sufficiently so that lines separated by as little as 50,000 cycles or $2 \times 10^{-6}$ wave numbers have been resolved in contrast to the situation in the infra-red, where it is difficult to resolve lines even 1 wave number apart. There should be the possibility of observing at least one million different lines in the microwave region which should be contrasted with about three thousand possible in the infra-red. Not only is the resolution good but also the frequency measurement techniques are extremely accurate. Equipments have been built which will measure the spectral lines to within plus or minus 0.05 mc. For descriptions of such apparatus reference is made to an article by W. E. Good and D. K. Coles in Physical Review 71, 383 (1947) on Precision measurements of $N_{14}H_3$ and $N_{15}H_3$, and to an article by M. W. P. Strandberg, R. Kyhl, T. Wentink and R. E. Hillger in Physical Review 71, 326 (1947) on Precision measurements. The measurement of a line to within one part in 500,000 at 1 cm. is better than the measurements in the infra-red and begins to approach the accuracy possible in the visible spectra.

Because of the relatively small energy changes involved in the absorption of microwave energy, almost all electronic and vibrational energy changes are excluded. All of the so-called fine structure effects in the infra-red and visible are observed here as relatively large order effects. A wealth of rotational spectra is found with complications caused by inversion doubling, nuclear quadrupole moments, centrifugal stretching, and many other effects. Perturbations caused by the Stark and Zeeman effects are appreciable and give interesting tools for the identification of transitions. The Stark effect, which is utilized in the present invention, was discovered experimentally in 1913. For a discussion of the Stark effect, reference is made to "Atoms, Molecules and Quanta" by Ruark and Urey (McGraw-Hill, New York, 1930) pages 147–157; and to articles by Stark in the Berlin Sitzungsberichte (1913) and in the Annalen Physik 43, 965, 983 (1914). Dakin, Good and Coles have studied the Stark effect in the microwave region, Physical Review 70, 560 (1946).

A number of investigators have described equipment for the study of the absorption spectra of gases in the centimeter wavelength region. These have usually consisted of a Klystron oscillator to supply the microwave energy, a wave guide section with mica windows to contain the gas sample, a crystal detector (or sometimes a bolometer) to convert the ultra-high frequency radiation traversing the sample into a low frequency signal, and a low frequency or D. C.

amplifier to amplify this rectified signal. This amplified voltage is displayed on the vertical plates of an oscilloscope while part of the same saw tooth voltage which is used on the Klystron reflector grid to sweep the oscillator over a narrow frequency range sweeps the spot horizontally. If a sufficiently strong and sharp absorption line of the gas occurs in the frequency region being covered, it will be seen as a minimum on the oscilloscope trace. This arrangement has the advantage of simplicity and convenience in searching for new lines, but it lacks the necessary sensitivity. To provide greater sensitivity without losing too much convenience, the method and apparatus of the invention were developed.

The basic principle employed by the present invention is the modulation of the absorption of microwave energy by the gas at a frequency which is not too high by the application of a varying voltage to an electrode in the gas cell, thus creating a time-dependent, alternating Stark effect. Frequencies of from 100,000 to 200,000 cycles per second have been found convenient. This introduces a modulation of the microwave energy at the frequency of the applied alternating voltage or a multiple thereof in the region of absorption lines. After rectification, as for example by a microwave crystal, the signal is amplified and detected by a narrow band radio receiver or other suitable amplifier and applied to the vertical plates of an oscilloscope. The horizontal plates of the oscilloscope are swept by part of the sawtooth voltage sweeping the reflector grid of the Klystron tube. The spectrum observed is considerably more complicated than that given by the simpler spectrograph described in the preceding paragraph, but, on the other hand, correspondingly more information is displayed.

It is accordingly an object of the present invention to provide an improved method of and means for detecting and analyzing the absorption spectra of gases at microwave frequencies.

Another object of the invention is to provide an improved microwave spectrograph which will be highly sensitive and yet simple and convenient to construct and operate.

A further object of the invention is to provide a microwave spectrograph having a gas cell provided with means to modulate at an audio or low radio frequency the absorption of microwave energy by the gas, thus creating a time dependent, alternating Stark-effect, together with receiving means to display the effects obtained.

Yet another object is to provide a microwave spectrograph which can be used as either an instrument in qualitative analysis to detect the presence of substances of known spectra in a gaseous mixture or as an instrument in quantitative analysis to determine the amounts of substances in a mixture of gases.

Still another object is to provide a microwave spectrograph which can be used to detect the presence of specified isotopic molecular species or to measure the quantitative abundance of such species or both.

Further objects and advantages of the invention will appear from the following detailed description of a preferred embodiment of the invention, taken in connection with the accompanying drawings, in which like numerals refer to like parts in the several views, and in which Fig. 1 is a block diagram of the apparatus and connections of the invention;

Fig. 2 is an enlarged plan view, partly in section, of the gas cell portion of the wave guide;

Fig. 3 is a transverse section of the gas cell on line 3—3 of Fig. 2, illustrating the manner of connecting an external conductor to the Stark central electrode; and Fig. 4 illustrates an oscilloscope trace for the $J=2$, $K=2$ inversion transition of ammonia as obtained with the apparatus of the invention.

The source of energy is the reflex Klystron 10. An electron gun in the tube provides high velocity electrons which are modulated on passing through the grid of a resonant cavity. After traversing a small distance, the electrons are turned back by a high negative voltage on the reflector grid. On passing back through the grid in the reverse direction they impart energy to the grid at the microwave frequency. As the velocity of an electron is changed on passing through the grid, the magnitude and sign depending upon the grid voltage at that time, the various electrons acquire different velocities in a uniform pattern as a function of time. On further transit they bunch into groups which give the stream considerable energy at the microwave frequency. The frequency of the oscillator is determined primarily by the resonant frequency of the cavity, which is changed by mechanical tuning. The frequency is also a function of the reflector voltage; a range of around 50 mc. can be covered by varying this voltage. On variation of the voltage, the mode is observed, there being a region of voltage over which the output starts at zero, builds up to a maximum, and then drops down to zero again. On either side of these limits, the tube does not oscillate for a considerable range of voltage change, until another mode is reached. A typical mode curve is seen on the monitoring oscilloscope 12 in Fig. 1.

The most utilized tube type is the QK-33, which covers the range from 20,000 to 26,000 mc. with sufficient power output. A QK-140 in the tube complement goes from 26,000 to 30,000 mc. A QK-141 has been found to oscillate between 33,500 and 37,600 mc. Frequency doublers can be used to get small amounts of very high frequency energy.

The power supply 14 (a TVN 8) for the microwave tube, supplies the filament and plate voltages as well as the saw-tooth sweep voltage. The voltage applied to the reflector grid is usually around 2,000 volts negative with respect to the tube case, which is grounded. The cathode voltage is from 1750 to 1800 volts negative while the grid is from 25 to 50 volts more negative than the cathode.

The monitoring functions are the display of the mode shape and the measurement of the microwave frequency; these are accomplished on the branch arms 16 and 18 of Fig. 1 off the main wave guide 20. A small amount of energy is diverted into the side arms by the unidirectional couplers, the level in the arms being 20 to 30 db lower than that in the main line. The branch 16 on the left regulated by an attenuator 17 monitors the mode. The rectified output from the crystal 22 after amplification in a good audio amplifier 24, a Ballantine meter for example, is then applied to the vertical axis of the monitoring oscilloscope 12, the horizontal axis of which is swept by the saw-tooth on the reflector grid. For the best operation of the spectrograph, there must be no discontinuities in the mode. Discontinuities in the center of the mode are frequently caused by insufficient isolation of the tube from the Stark ecect gas cell. This is remedied by increasing the attenuation of an attenuator 25 between the guide 20 and the cell 34.

The second side arm 18 is used to measure the microwave frequency. A wave meter 26, usually the transmission type, TFK-6, is connected to an attenuator 28 on the unidirectional take off. The meter 26 transmits energy only when the microwave frequency is tuned to the meter resonance. The standard K-band crystal 30, 1N-26, rectifies the energy. As the wave meter has a Q of only 10,000, the maximum is rather wide, being not much narrower than the mode in some regions of the spectrum. These are several settings of the micrometer for which the energy at one frequency will come through. Readings are taken at two of these and subtracted to give a half wave length in the meter for which the frequency can be found in a chart.

A switch 32 chooses the output of the crystal to be monitored. The switch 32 may optionally have several other positions with cables going to other places in the circuit for monitoring.

The cell 34 for the gas, which is a section of the wave guide 20 with the Stark electrode 36, consists of the usual K-band wave guide with outside dimensions of ½ x ¼ inch with an electrode installed in the center. Two different types of electrodes have been tested; one (as shown in Figs. 2 and 3 of the drawings), a flat strip of brass in the middle dividing the guide into two sections ½ x ⅛ inch; the other, a wire down the center. Because more information can be obtained from the strip guide, it is described in greater detail.

The strip electrode 36 is a piece of flat, soft brass 0.408 inch wide by 0.017 inch thick and slightly shorter than the length of the gas cell. Pieces of microwave permeable dielectric material 38, 0.166 by $\frac{1}{16}$ inch, 6 inches long, with a groove 40, 0.017 inch wide by 0.049 inch deep milled in the center, are aligned along the narrow sides of the guide to hold the electrode in place. Pressed powdered polystyrene has been successfully used as the dielectric material. The electrical connection to the strip is made by a wire 42 extending through a slot 43 in the side of the cell 34 and extending into a Kovar tube 44 hard soldered at 46 on the small side of the guide and sealed with glass at 48. The wire 42 is soldered at 50 to the central Stark electrode 36. A brass cover (not shown) may be used to hold a type N chassis connector to insure good electrical connections to a cable and mechanical rigidity. The electrical capacity of the Stark-effect cell is about 50 mmf. per foot.

To hold the vacuum the ends of the cell 34 are made gas tight with microwave permeable windows 56 of mica or the like sealed on with a low melting wax 58. The housing on top of the cell serves as the gas inlet. The narrow slit 53 in the center of the top of the waveguide does not interfere with the propagation of the microwaves and is the inlet into the cell. The housing 51 is a convenient cover for the slit and makes the connection to a small Kovar tube 54 simple. The units are either soldered or brazed together as shown by the fillets 52. A glass tube, not shown, welded to the Kovar tube 54 leads to the vacuum system. Optionally the cell may be provided with vacuum connections at both ends so that air or any other gas may be pumped therethrough. The cell 34 is connected to the other sections of the guide 20 by means of brass flanges 60 and bolts 62.

Another type of cell is the wire guide and is not shown in detail in the drawings. The wire, replacing the strip electrode, may be supported in a waveguide section by insulated Kovar metal sleeves at each end of the guide. This cell has the very decided advantage of being very easily and quickly evacuated and has been found not to absorb gases to any great extent. The wire guide also has the advantage that a very high voltage can be put onto it with the expenditure of very little power.

The spectrograph of the invention may be provided with a plurality of different cells and electrodes; for example there may be two strip guides and one wire guide. A ten foot strip guide is useful for most of the work, especially the study of the Stark splitting of the lines. A small, 10 inch strip guide may be maintained always full of ammonia as a standard. It will serve as a reference section to test the performance of the apparatus at any time, which can be done with ease by throwing several switches to put this guide into the system. A five foot wire guide has been found useful to search for new lines.

The block diagram of the voltage sources for the Stark electrode, the modulator, is also shown in Fig. 1. In the early development of the apparatus, a high voltage sine wave was employed. As the interpretation of the spectra is much simpler when a square wave rather than when a sine wave is applied to the electrode, square waves are used more frequently. Provision may be made for both sine wave and square wave modulation in the equipment of the invention.

Modulation frequencies most often employed have been 100 kc. and 200 kc. The frequency should be chosen in view of the known characteristics of the receiver used in the detection apparatus, the frequency yielding the best signal to noise ratio in conjunction with adequate gain generally being preferable.

The frequency employed on the Stark effect electrode may be very low or it may be an audio or a radio frequency. There are advantages in using a radio frequency in the neighborhood of 100,000 cycles per second since convenient and high sensitivity amplifiers are available for this frequency region, namely, high grade radio receivers. Furthermore, with certain types of detection such as crystal detection, the signal to noise ratio appears to be better at higher frequencies. The frequency should not be too high, however, because if it is much higher than the frequency of the collisions between the molecules at the pressures used the energy levels will cease to follow the alternating electric field and the Stark effect method of modulation will begin to fail. Since pressures of the order of one thousandth of a millimeter of mercury to one millimeter of mercury normally are used, it is ordinarily undesirable to use frequencies in excess of a few hundred kilocycles or perhaps one megacycle. Special circumstances might arise where higher pressures were employed, in which case high frequencies of modulation could be used.

For many observations proper gas pressure is important. If the pressure is too high, the line breadth is too great and the absorption will not change sufficiently when the Stark effect voltage is supplied. If the pressure is too low saturation effects may interfere with the performance of the instrument. Normally pressures from one thousandth of a millimeter to one millimeter are found to be suitable. With higher modulating voltages or higher Stark effect displacements, higher gas pressures can be used.

A primary frequency generator 64 is provided, and may be a Hewlett-Packard audio oscillator which has a maximum frequency of 200 kc., or other suitable equipment may be used.

Several pieces of equipment are required to generate high frequency square waves at high voltages and at the low impedance of the strip guide. A square wave generator 68, such as Hewlett-Packard model 210Z, generates square waves from the fundamental sine waves. Because the output impedance of it is around 500 ohms whereas the wave guide has an impedance of around 50 ohms, a power amplifier 70 has to be used to match the impedances. Two different ones have been employed, one giving a comparatively low square wave voltage, the other a higher square wave voltage.

The low voltage square wave amplifier tested was found to deliver a maximum of around 120 volts peak to peak square wave into the long strip guide of 1000 mmf. capacity. It comprised a power amplifier followed by a cathode follower output stage. The voltage output may be varied by changing the input, by changing the attenuator on the output of the Hewlett-Packard square wave generator.

To simplify the interpretation, it is often desirable to introduce a D. C. component so that one side of the square wave corresponds to zero voltage on the electrode. For this purpose a D. C. supply 72 is provided, connected through a choke 74 to the conductor 42. D. C. is kept from the square wave amplifier 70 by interposing a condenser 76 in the line 42 between the D. C. supply 72 and the amplifier 70.

A high voltage square wave amplifier was also tested and found to deliver about 350 volts peak to peak square wave into a capacity of 1000 mmf. It included a push-pull power amplification stage to drive two pulse transformers, the transformer outputs operating two switching tubes. In this type of amplifier when the upper tube is conducting, the charge on the condenser, the load, is built up to maximum in only a small portion of a cycle. At the start of the next half cycle, the lower tube is made conducting which discharges the condenser very rapidly. The square wave as it comes out of the amplifier is automatically zero based, i. e. one side of the square wave is at zero voltage. This amplifier should be operated with the output of the Hewlett-Packard square wave generator at maximum. The amplitude of the power amplifier may be changed by varying the plate voltage from the power supply; the adjacent power supply has a variac to vary the high voltage output. At low voltages in the order of a few volts, the high voltage square wave amplifier does not put out good square waves, but at high voltages the wave form is excellent.

The block diagram for the detector unit also appears in Fig. 1. After passage through the cell 34, the microwave energy is rectified by a crystal 78 using either a tuned or untuned crystal holder. The tuned holder will increase the output over a small frequency range without retuning, but will decrease it for frequencies farther away. The rectified signal is fed into a highly sensitive and selective radio receiver 80 such as a National HRO receiver, model 5TA1. A microammeter (not shown) may be used to measure crystal current, A. C. being kept from the meter by an inductance. The coil and the meter serve as the ground return for the direct current. Because the crystal is more efficient if the D. C. return path resistance is small, the coil and meter should have resistances of only a few ohms. This meter serves as a good monitor of the tube power output, which is not true of the mode monitoring side arms 16 and 18 because of resonances in the couplers. Because the conversion efficiency of the crystal is greater at high currents, the current should be kept high, if high gas pressures are used. At low pressures there may be saturation effects at high power levels.

It is important that a good receiver be used. The latest model (5TA1) National HRO receiver has been found satisfactory and others having similar characteristics could be used. The crystal filter of the receiver which at the most selective setting has a band width of about 100 cycles at the half power points, greatly improves the signal to noise ratio. To avoid distortion and loss of sensitivity, the sweep frequency must be kept low, about 15 cycles or less, depending upon the line widths and the frequency limits of the sweep. Because of the frequency and phase distortion in the audio amplifier of the receiver, the output is taken directly from the second detector and applied to the vertical axis amplifier of an oscilloscope 82, such as a Dumont 208. The Klystron reflector grid sweep voltage moves the spot horizontally.

As the pressures normally employed in the cell 34 range from 1 mm. to $10^{-4}$ mm., only a moderately good vacuum system (not shown) is needed. It is essential that the cell have very little leakage; no change in pressure should be observed in the evacuated guide over a period of hours. Hours are usually required to evacuate a new guide, especially a guide with polystyrene. In fact, the longest polystyrene guides may require two or three days to remove all of the volatile matter and absorbed gases during the first evacuation.

A small, single stage, oil diffusion pump works reasonably well, although a large diffusion pump would be desirable in evacuating new guides. With an ordinary backing pump no difficulty should be experienced in obtaining pressures around $10^{-4}$ mm. with this equipment.

*Interpretation of oscilloscope pattern*

While it is experimentally simplest to use a sine wave voltage on the Stark effect electrode, the interpretation of the results is clearer and easier if a square wave voltage is employed. Assume that the Klystron 10 is swept over the small frequency range in the vicinity of an absorption line of the gas, and that a square wave voltage of from 50 to 100 kc. is applied to the electrode 36 in the gas cell wave guide 34 in such a way that the voltage is zero for half of each cycle and has some positive value for the other half. During the zero voltage half of the cycle the gas absorbs some of the microwave energy (usually less than 0.1%) at the frequency of the line. During the other half of the cycle, the absorption line is broadened, split, or displaced because of the Stark effect. The absorption during the second half of the cycle at the stated microwave frequency is therefore reduced. Consequently, a small fraction of the microwave energy at the original line frequency reaching the crystal detector 78 is modulated at the frequency of the square wave. This modulated portion only is amplified by the radio receiver 80 and finally displayed on the screen of the oscilloscope 82. Thus a deflection at the original line frequency is observed. On the other hand, when the microwave frequency coincides with that of one or more of the Stark components, modulation will correspondingly occur again, this time with opposite phase, i. e., the greatest absorption will occur when the Stark voltage is positive, none when the voltage is zero. Since the receiver is not phase selective, unsplit lines and their displaced Stark components both will occur as deflections on the oscilloscope screen. Fig. 4 shows such a pattern 84 for the $J=2$, $K=2$ inversion transition of ammonia. The minimum 86 on the right is due to the undisplaced line while the two minima 88 and 90 on the left are the $M=1$ and the $M=2$ components of the Stark pattern respectively. This is of course a second order Stark effect. In many cases, however, it is difficult to apply sufficient voltage to resolve completely the components from the main line in which case a characteristic double minima trace is displayed.

The absolute sensitivity of the apparatus is not definitely known. In one of the early equipments, the 1, 1, 2, 2 and 3, 3 lines of $N^{15}$ ammonia were detected in natural ammonia. This corresponds to a sensitivity of about $10^{-6}$ nepers/cm. With apparatus having double the length of wave guide and using a receiver with a crystal filter, the sensitivity is better than $10^{-7}$ nepers/cm. The sensitivity increases rapidly with increasing power, being approximately proportional to the crystal current. For lines with weak Stark effects the sensitivity is less.

*Sine wave modulation*

A Stark effect voltage has been used consisting of a sine wave of from 50 to 100 kc. The modulating sine wave voltages which give the best results vary over a wide range for different molecules and may even vary for different lines of the same molecule. For ammonia, sulphur dioxide, and other substances showing a second-order Stark effect, voltages of from 10 to 200 volts peak to peak and from 5 to 100 volts D. C. were used. The D. C. voltage should be about one-half of the peak to peak A. C. voltage if maximum intensity is to be obtained. For those lines of methyl alcohol which display an essentially first-order Stark effect, only one or two volts are required and larger values are not desirable.

The spectrum observed from a single line with sine wave modulation is very hard to interpret, especially if it has a strong Stark effect and if a fairly large sine wave is used. At low voltages a single pip is seen which gradually breaks up into two or more components with spreading out as the voltage is increased. As many as five or six separate pips have been obtained even for the 3, 3 transition in ammonia. For substances with weaker Stark effects, a simple single wide line may be observed. It is difficult to separate the components if A. C. and D. C. are kept at about the same value. If the D. C. voltage is made much larger than the A. C. it may be possible to separate the various components. This has been done for some of the low quantum number ammonia lines.

Sine wave modulation has the advantage that it takes a much lower wattage amplifier to provide the modulation as the guide can be made to resonate with an inductance. Therefore it is easier to provide high voltages. With square wave modulation, no resonant circuit can be used so that the impedance is low and a high power amplifier is required.

It will therefore be seen that the apparatus and method of the invention provide an improved and more sensitive means and method for detecting and analyzing the absorption spectra of gaseous materials at microwave frequencies. In the foregoing description a preferred embodiment has been described, but it will be apparent that changes and modifications may be made therein within the spirit and scope of the invention as set forth in the appended claims.

We claim:

1. A microwave spectrograph comprising, in combination: a cell for enclosing a microwave energy absorptive gas, means for passing microwave energy through said cell to establish a microwave field in said gas, means to apply to the gas an electric field varying with time at a frequency lower than that of said microwaves to produce a time-dependent alternating Stark effect field within said cell to modulate said microwave energy, and means to receive and display such modulated energy.

2. A microwave spectrograph comprising, in combination: a cell for enclosing a microwave energy absorptive gas, means for passing microwave energy of predetermined frequency through said cell to establish a microwave field in said gas, means for applying to the gas within said cell an electric field varying with time at a low radio frequency to produce a time-dependent alternating Stark effect field within said cell to modulate said microwave energy, and means to rectify, amplify and display such modulated energy.

3. A microwave spectrograph comprising, in combination: a cell for enclosing a microwave energy absorptive gas, an electrode within said cell, means for passing microwave energy of predetermined frequency through said cell to establish a microwave field in said gas, means for impressing on said electrode a voltage varying with the time at a frequency less than the collision frequency of the molecules of the absorbing gas to produce a time-dependent alternating Stark effect field within said cell to modulate said microwave energy, and means to receive and display such modulated energy.

4. A microwave spectrograph comprising, in combination: a cell for enclosing a microwave energy absorptive gas, means for passing microwave energy of predetermined frequency through said cell to establish a microwave field in said gas, means to apply to the gas an electric field varying in a sinusoidal manner with time at a frequency less than the collision frequency between the molecules of the absorbing gas to produce a time-dependent alternating Stark effect field within said cell to modulate said microwave energy, and means to receive and display such modulated energy.

5. A microwave spectrograph comprising, in combination: a cell for enclosing a microwave energy absorptive gas, means for passing microwave energy of predetermined frequency through said cell to establish a microwave field in said gas, means to apply to the gas a constant electric field, means to apply in addition to the gas an electric field varying in a sinusoidal manner with time at a frequency less than the collision frequency of the molecules of the absorbing gas to produce a time-dependent alternating Stark effect field within said cell to modulate said microwave energy, and means to receive and display such modulated energy.

6. A microwave spectrograph comprising, in combination: a source of microwaves, means to sweep the frequency of said source through a variable predetermined range, a wave guide leading from said source to conduct such microwaves, a cell inserted in said wave guide for enclosing a microwave energy absorptive gas and having microwave permeable windows, an electrode suspended within said cell, a power supply for impressing a constant voltage on said electrode, a modulator for impressing in addition on said electrode a voltage varying sinusoidally with time at a frequency lower than the collision frequency of the molecules of the absorbing gas to produce a time-dependent alternating Stark effect field within said cell to modulate said microwave energy, a crystal rectifier arranged at the end of said wave guide away from said source to rectify the modulated microwaves, a receiver to receive the output of said rectifier and to amplify the same at the modulation frequency, and an oscilloscope connected to receive the output of said receiver and adapted to display the rectified and amplified energy.

7. A microwave spectrograph comprising, in combination: a source of microwaves of controllable frequency, a wave guide leading from said source to conduct said waves, a section of said guide being hermetically sealed off by microwave permeable windows to provide a cell for enclosing a microwave energy absorptive gas, an electrode arranged when charged to apply an electric field to said gas, a power supply for impressing a constant voltage on said electrode, a modulator for impressing in addition on said electrode a voltage varying sinusoidally with time at a frequency lower than the collision frequency of the molecules of said gas to produce a time-dependent alternating Stark effect field within said cell to modulate said microwave energy, a crystal rectifier arranged at the end of said wave guide away from said source to rectify the modulated microwaves, a receiver to receive the output of said rectifier and to amplify the same at the modulation frequency, and an oscilloscope connected to receive the output of said receiver and adapted to display the rectified and amplified energy.

8. A microwave spectrograph comprising, in combination: a reflex Klystron tube to generate microwaves, a wave guide leading therefrom to conduct such microwaves, a cell inserted in said wave guide for enclosing a microwave energy absorptive gas and having microwave permeable gas-tight windows sealing the ends thereof, a flat strip electrode centrally disposed within said cell and running substantially the length thereof, a source of voltage connected to said electrode for impressing on said electrode a constant potential superimposed upon a potential varying with time at a low radio frequency to produce a time-dependent alternating Stark effect field within said cell to modulate said microwave energy at such low frequency, a crystal rectifier arranged to receive the modulated microwave energy and to rectify the same, a narrow band receiver connected to said crystal to amplify the microwave energy at the modulated frequency, an oscilloscope adapted to display the rectified and amplified energy on the vertical plates thereof, and a power supply to generate a saw tooth voltage, said saw tooth voltage being applied to the reflector grid of said Klystron tube to sweep the frequency thereof through a predetermined range and a portion of said saw tooth voltage being applied to the horizontal plates of said oscilloscope.

9. A microwave spectrograph comprising, in combination: a reflex Klystron tube to generate microwaves, a wave guide leading therefrom to conduct such microwaves, a cell inserted in said wave guide for enclosing a microwave energy absorptive gas and having microwave permeable gas-tight windows sealing the ends thereof, a flat strip electrode centrally disposed within said cell and running substantially the length thereof, a source of voltage connected to said electrode for impressing on said electrode a constant potential superimposed upon a potential varying with time at a low radio frequency to produce a time-dependent alternating Stark effect field within said cell to modulate said microwave energy at a multiple of such low frequency, a crystal rectifier arranged to receive the modulated microwave energy and to rectify the same, a narrow band receiver connected to said crystal to amplify the microwave energy at the modulated frequency, an oscilloscope adapted to display the rectified and amplified energy on the vertical plates thereof, and a power supply to generate a saw tooth voltage, said saw tooth voltage being applied to the reflector grid of said Klystron tube to sweep the frequency thereof through a predetermined range and a portion of said saw tooth voltage being applied to the horizontal plates of said oscilloscope.

10. In a microwave spectrograph having a source of microwaves, a wave guide, and receiving and display means, means to modulate said microwaves comprising a cell in said guide for enclosing a microwave energy absorptive gas and having microwave permeable windows to permit passage therethrough of said waves, an electrode arranged to apply an electric field to said gas and a voltage source to impress a varying potential on said electrode at a frequency lower than the collision frequency of the molecules of said gas to produce a time-dependent alternating Stark effect field within said cell.

11. A method of observing the absorption spectra of gases at microwave frequencies which comprises passing microwaves through a microwave energy absorptive gas specimen, modulating the absorption of the microwaves at a frequency lower than the collision frequency of the molecules of said gas by applying to said gas an electric field varying with time at such lower frequency to create a time-dependent alternating Stark effect, and receiving and displaying such modulated energy.

12. A method of observing the absorption spectra of gases at microwave frequencies which comprises passing microwaves through a microwave energy absorptive gas specimen, modulating the absorption of the microwaves at a predetermined audio frequency by applying to said gas an electric field varying with time at such frequency to create a time-dependent alternating Stark effect, and receiving and displaying such modulated energy.

13. A method of detecting the presence of a substance in a gaseous mixture by observing the absorption spectrum of a gas sample at microwave frequencies which comprises passing microwaves through the sample, impressing on said gas an electric field varying with time at a frequency less than the collision frequency of the molecules of said gas to produce a time-dependent alternating Stark effect to modulate the absorption of said microwaves, and rectifying, amplifying, and displaying such modulated energy.

14. A method of determining quantitatively the amount of a substance in a gaseous mixture by observing the absorption spectrum of the gaseous mixture at microwave frequencies which comprises passing microwaves through the sample, impressing on said gas an electric field varying with time at a frequency less than the collision frequency of the molecules of said gas to produce a time-dependent alternating Stark effect, and measuring such modulated energy.

15. A method of determining qualitatively the presence of isotopic species of a substance in a gaseous sample by observing the absorption spectrum of the mixture at microwave frequencies which comprises passing microwaves through the sample, impressing on said gas an electric field varying with time at a frequency less than the collision frequency of the molecules of said gas to produce a time-dependent alternating Stark effect, and rectifying, amplifying, and displaying such modulated energy.

16. A method of determining quantitatively the amount of an isotopic species of a gaseous substance by observing the absorption spectrum of the gaseous mixture at microwave frequencies which comprises passing microwaves through the sample, impressing on said gas an electric field varying with time at a frequency less than the collision frequency of the molecules of said gas to produce a time-dependent alternating Stark effect, and measuring such modulated energy.

17. A method of determining quantitatively the amount of a substance in a gaseous mixture by observing the absorption spectrum of a gas sample at microwave frequencies which comprises passing microwaves through the sample, modulating the absorption of the microwaves at a predetermined low radio frequency by impressing an electric field varying with time at a low radio frequency on said gas to create a time-dependent alternating Stark effect, and measuring such modulated energy.

18. A method of determining qualitatively the presence of isotopic species of a substance in a gaseous sample by observing the absorption spectrum of the mixture at microwave frequencies which comprises passing microwaves through the sample, modulating the absorption of the microwaves at a predetermined low radio frequency by impressing an electric field varying with time at a low radio frequency on said gas to create a time-dependent alternating Stark effect, and rectifying, amplifying, and displaying such modulated energy.

19. A method of determining quantitatively the amount of an isotopic species of a gaseous substance in a gaseous sample by observing the absorption spectrum of the gaseous sample at microwave frequencies which comprises passing microwaves through the sample, modulating the absorption of the microwaves at a predetermined low radio frequency by impressing an electric field varying with time at a low radio frequency on said gas to create a time-dependent alternating Stark effect, and measuring such modulated energy.

20. In a microwave spectrograph having a source of microwaves and a receiver for receiving and displaying its output, the combination comprising: a cell for enclosing a microwave energy absorptive gas, a microwave conductor for passing microwave energy from said source through said cell to establish a microwave field in said gas, an electrode arranged when charged to apply an electric field to said gas, and a power supply for impressing on said electrode a voltage varying with time at a frequency lower than that of said microwaves to produce a time-dependent alternating Stark-effect field within said cell to modulate said microwave energy.

21. A method of observing the absorption spectra of gases at microwave frequencies which comprises passing microwaves through a microwave energy absorptive gas specimen, modulating the absorption of the microwaves at a predetermined low radio frequency by applying to said gas an electric field varying with time at said frequency to create a time-dependent alternating Stark-effect, and receiving and displaying such modulated energy.

22. A method of observing the absorption spectra of gases at microwave frequencies which comprises passing microwaves through a microwave energy absorptive gas specimen, modulating the absorption of the microwaves at a predetermined frequency not substantially above the collision frequency of the molecules of said gas by applying to said gas an electric field varying with time at said frequency to create a time-dependent alternating Stark-effect, and receiving and displaying such modulated energy.

23. In a microwave spectroscope, the combination comprising, a wave guide section containing a gas sample, a source of microwave energy, means for modulating the frequency of said source over a predetermined range of frequencies, means for applying a low frequency electric field across said gas sample comprising an electrode located interiorly of said wave guide section, means coupling said source of microwave energy to the input end of said wave guide section, detecting means responsive only to microwave energy modulated at the frequency of said low frequency field coupled to the output end of said wave guide section, a cathode ray tube indicator having a cathode ray beam, means for establishing a frequency axis on the face of said indicator in synchronism with variations of the modulating frequency of said source of microwave energy, and means for deflecting said cathode ray beam transversely of said frequency axis in response to signal derived from said detecting means.

24. The combination in accordance with claim 23 wherein said electric field is substantially uniform at all points in said gas sample.

EDGAR B. WILSON, JR.
RICHARD H. HUGHES.

References Cited in the file of this patent

UNITED STATES PATENTS

| Number | Name | Date |
|---|---|---|
| 2,401,425 | Hershberger | June 4, 1946 |

OTHER REFERENCES

Physical Review, vol. 70, Nos. 7 and 8, October 1 and 15, 1946, page 560, article by Dankin et al., "Resolution of a rotational line of the OCS molecule and its stark effect."

Physical Review, vol. 71 (1947), pages 562 and 563.